(12) United States Patent
Hugler

(10) Patent No.: US 9,519,110 B2
(45) Date of Patent: Dec. 13, 2016

(54) DETECTOR, LIGHT GUIDE AND UTILITY METER

(71) Applicant: ITRON GMBH, Karlsruhe (DE)

(72) Inventor: Karsten Hugler, Karlsruhe (DE)

(73) Assignee: Itron GmbH, Karlsruhe (DE)

( * ) Notice: Subject to any disclaimer, the term of this patent is extended or adjusted under 35 U.S.C. 154(b) by 0 days.

(21) Appl. No.: 14/432,118

(22) PCT Filed: Nov. 12, 2013

(86) PCT No.: PCT/EP2013/073661
§ 371 (c)(1),
(2) Date: Mar. 27, 2015

(87) PCT Pub. No.: WO2014/076100
PCT Pub. Date: May 22, 2014

(65) Prior Publication Data
US 2015/0253508 A1     Sep. 10, 2015

(30) Foreign Application Priority Data

Nov. 13, 2012 (EP) ..................................... 12192475

(51) Int. Cl.
*G02B 6/42* (2006.01)
*G02B 6/35* (2006.01)
*G01D 5/347* (2006.01)

(52) U.S. Cl.
CPC ........... *G02B 6/353* (2013.01); *G01D 5/34723* (2013.01); *G02B 6/4214* (2013.01)

(58) Field of Classification Search
CPC ... G02B 6/3546; G02B 6/3512; G02B 6/3584; G02B 6/3556; G02B 6/42

(Continued)

(56) References Cited

U.S. PATENT DOCUMENTS 3,394,630 A      7/1968  Glock
7,182,526 B1 *   2/2007  Wittl ........................ G02B 6/43
                                                          385/88

(Continued)

FOREIGN PATENT DOCUMENTS

DE       102006047471       4/2008
EP            1995567       11/2008

(Continued)

OTHER PUBLICATIONS

International Searching Authority, International Search Report and the Written Opinion issued in connection with International Application No. PCT/EP2013/073661, dated May 8, 2014, 15 pages.

(Continued)

*Primary Examiner* — Jennifer Doan
(74) *Attorney, Agent, or Firm* — Hanley, Flight & Zimmerman, LLC

(57) ABSTRACT

A detector is provided for detecting the interruption of a light path, the detector comprising a light emitter, a light receiver, and a light guiding arrangement disposed opposite the light emitter and receiver. A gap is defined between the light guiding arrangement and at least one of the light emitter and receiver to receive a movable part capable of interrupting the light path there between. Also provided is a light guide for use with such a detector and a utility meter comprising such a detector. In one specific embodiment, an opto electronic detector for detecting rotation of a coding wheel in a utility meter is provided.

16 Claims, 1 Drawing Sheet

(58) Field of Classification Search
USPC .......................... 385/15, 16, 19, 27, 31, 33
See application file for complete search history.

(56) References Cited

U.S. PATENT DOCUMENTS

| | | | |
|---|---|---|---|
| 8,553,014 B2* | 10/2013 | Holmgren | G06F 3/0421 345/173 |
| 2004/0179784 A1* | 9/2004 | Vancoille | G02B 6/4246 385/47 |
| 2006/0043322 A1 | 3/2006 | Ishikawa | |
| 2010/0134790 A1 | 6/2010 | Vokinger et al. | |
| 2011/0272566 A1 | 11/2011 | Lippuner | |

FOREIGN PATENT DOCUMENTS

| | | |
|---|---|---|
| EP | 2213987 | 8/2010 |
| JP | 60155919 | 8/1985 |
| WO | 02086424 | 10/2002 |
| WO | 2008040473 | 4/2008 |

OTHER PUBLICATIONS

European Patent Office, Extended European Search Report issued in connection with European Patent Application No. 12192475.7, dated Jul. 4, 2013, 10 pages.

Patent Cooperation Treaty, "International Preliminary Report on Patentability", issued in connection with PCT Application No. PCT/EP2013/073661, issued on May 19, 2015, 8 pages.

European Patent Office, "Communication pursuant to Article 94(3) EPC," issued in connection with European Patent Application No. 12192475.7, issued on Sep. 30, 2016, 4 pages.

* cited by examiner

DETECTOR, LIGHT GUIDE AND UTILITY METER

The present invention relates to a detector for detecting interruption of a light path, in particular although not exclusively by a coding wheel of a utility meter. The present invention further relates to ways to define the light path for such a detector and to a utility meter, in particular but not exclusively a gas meter, using such a detector.

In known utility meters, such as gas meters, a sensor, for example a flow sensor, translates consumption of a utility such as gas into movement of a movable part, typically rotation of a coding wheel in the metrological part of the meter. The metrological part of a gas meter consumes a considerable percentage of the battery capacity. It is a central component of gas and other meters and is expected to be fully reliable and robust over twenty years of meter lifetime and more. Therefore, it is desirable to improve the reliability and to reduce power consumption of the metrological part. It is also desirable to provide utility meters which are easy to assemble.

Known arrangements for detecting the movement of a coding wheel using slotted interrupters, or discrete components interconnected with a slot in the PCB, suffer from the drawbacks of low efficiency and sensitivity to mechanical perturbation.

In one aspect, there is provided a detector for detecting interruption of a light path. The detector comprises a light emitter, a light receiver and a light guiding arrangement disposed opposite the light emitter and receiver. There is a gap between the light guiding arrangement and at least one of the light emitter and receiver. A light path between a light emitter and receiver can be interrupted by a movable part in the gap. The light guiding arrangement comprises a collimator arranged to collimate light from the light emitter and a guide arranged to guide light from the collimator to the light receiver.

Advantageously, by providing the receiver and emitter on one side of the gap accepting a movable part such as a coding wheel and a light guiding arrangement on the other side of the gap to guide light from the emitter to the receiver, an energy efficient and stable arrangement can be achieved. By providing the emitter and receiver both on one side of the gap, for example extending through respective through holes in a carrier or otherwise being mounted next to each other on a flat carrier, such as a PCB, the arrangement can be made mechanically stable. Naturally, mechanical stability can be achieved in a variety of other specific configurations due to the location and orientation of the receiver and emitter relative to the gap. By providing a light guiding arrangement with a collimator to guide light from the emitter to the receiver, substantially all of the light emitted by the emitter may be captured and efficiently guided by the light guiding arrangement to the receiver. The combination of these elements provides an efficient detector which is easy to manufacture and assemble and provides high structural integrity.

In some embodiments, the light emitter may be an infrared (IR) light emitting diode (LED). LEDs emitting in other wavelengths, for example visible light, may equally be used. It will be understood that the term light is used herein for convenience and is not limited to visible electromagnetic radiation.

In some embodiments, the light guiding arrangement comprises a concentrator arranged to focus light from the guide towards the light receiver. The guide may, in some embodiments, comprise a first reflective surface arranged to reflect light received from the collimator to a second reflective surface arranged to direct the received light towards the light receiver. The first and second reflective surfaces may be perpendicular to each other in some embodiments.

In some embodiments, the detector may comprise one or more further light emitters, one or more further light receivers and one or more further guiding arrangements arranged in the same manner as the light emitter, light receiver and guiding arrangement described above, to enable detecting an interruption of a further light path by the movable part.

In a further aspect, there is provided a light guide shaped to define an entry surface that is arranged to collimate light entering the light guide in a entry direction along an optical axis. The light guide is further shaped to define a plurality of planar reflective surfaces arranged to reflect light inside the light guide along the optical axis to exit the light guide at an exit surface in an exit direction. The exit direction has a component in a direction opposite the entry direction.

Advantageously, by providing a light guide incorporating a collimating surface and planar reflective surfaces to reflect light such that it is directed in an exit direction back to where the light came from (the exit direction having a component in a direction opposite the enter direction), a simple and robust light guiding arrangement particularly useful in a detector as described above is provided. Of course, other uses of the light guide wherever light needs to be sent efficiently back in a direction to where it came from are also possible while benefitting from the advantages provided by the disclosed light guide.

In some embodiments, the optical axis at the exit surface is parallel to the optical axis at the entry surface, therefore sending the received light back in a direction opposite to the direction in which it was received. In particular, these embodiments may have two reflective surfaces. To achieve the desired redirection of the light, the two reflective surfaces may be substantially perpendicular to each other. It will be understood that the terms "parallel", "perpendicular" and "opposite direction", etc are used herein not to define strict geometrical compliance with these words but rather allow for variations within manufacturing limits and otherwise while retaining the benefit of directing light in a direction substantially opposite to that in which the light was received, for example to enable a light emitter and receiver to be provided on a common support facing substantially in the same direction.

In some embodiments, the exit surface may be shaped to focus light exiting the light guide along the optical axis. In this way, light can be focused on to a detection plane of a light receiver such as a photodiode, thereby increasing light capture efficiency and/or allowing greater flexibility in the design of the detection area of the receiver.

In some embodiments, the light guide is moulded and/or machined as one piece, thereby providing a sturdy, unitary construction. Further, the plurality of reflective surfaces may be arranged to reflect light received along the optical axis by total internal reflection, resulting in high efficiency light redirection without the need for a separate surface coating.

In some embodiments, the light guide has two limbs extending from either end of a back portion, the free ends of the limbs being respectively shaped to provide the entry and exit surfaces. The ends of the back portion are shaped to each provide a respective reflective portion. Advantageously, this provides a light guide of simple construction with high efficiency. One of the limbs, in some embodiments, may be shorter than the other one. This enables the longer one of the limbs to be disposed close to the emitter or receiver, as the case may be, thereby providing a space for accepting a movable part capable of intersecting the optical axis between the shorter one of the limbs and the other one of the receiver or emitter.

In some embodiments, the light guide may comprise one or more further entry surfaces to define one or more further optical axes. The further optical axes are parallel to the optical axis between the entry surface and the exit surface of the light guide as described above. Therefore, by providing a parallel optical path in the same work piece, an efficient and easy to install construction may be achieved for a dual light path application. The optical paths may share certain elements, such as the reflective surfaces, or may be provided in separate portions of the light guide with separate respective surfaces, allowing material to be spared between the two light paths.

A detector as described above may, in some embodiments, comprise a light guide as just described as the light guiding arrangement. In such embodiments, the entry surface provides the collimator, the guide is provided by the reflective surfaces, and so on.

In yet a further aspect, there is provided a utility meter comprising a detector as described above, the movable part being coupled to a consumption sensor such that movement of the movable part is indicative of a quantity sensed by the consumption sensor.

In one particular embodiment, the movable part is a coding wheel driven by the consumption sensor, with rotation of the wheel being indicative of the consumption of the sensed quantity, for example indicative of the flow of gas through a gas meter. Equally, the above embodiments are also applicable to other utility meters, for example water, heat or electricity meters, with the movement of the coding wheel being indicative of the flow of, for example, water or current. In fact, the embodiments described above are applicable to any metering or sensing device in which movement of a movable part is converted to an opto-electrical signal. An example of such further applications is in the field of rotor position transducers for electric motors, in which movement of a vane associated with a rotor of the electric motor is detected by a corresponding opto electric detector.

A specific embodiment is now described by way of example only and with reference to the accompanying drawings in which.

Figure 1:
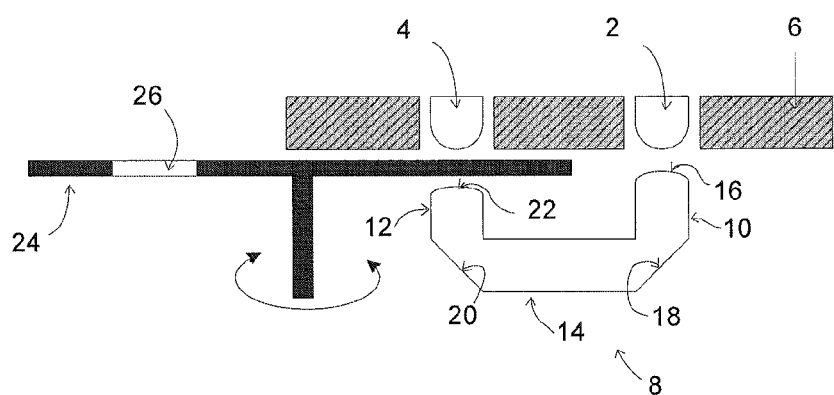
FIG. 1 shows a schematic view of an embodiment.

With reference to FIG. 1, an opto-electronic detector comprises an emitter 2 and a receiver 4 carried by a PCB 6. The emitter comprises a IR-LED with a lens extending through a through hole in the PCB 6. Likewise, the receiver 4 comprises a photodiode with a lens extending through a through hole in the PCB 6. The emitter 2 is thus arranged to emit light (IR radiation) to one side away from the PCB 6 and receiver 4 is arranged to receive light directed towards the PCB 6 from the same side.

Opposite the emitter 2, receiver 4 and PCB 6, a light guide 8 is disposed to receive light from the emitter 2 and direct it to the receiver 4. The light guide comprises first (10) and second (12) limbs extending from a back portion 14 towards the PCB 6.

A free end 16 of the limb 10, arranged adjacent the emitter, receives light from the emitter and transmits it to a reflective surface 18. The free end 16 is shaped so as to collimate light received along an optical axis of the light guide 8, in particular to collimate light from the emitter 2 to be substantially parallel within the light guide 8. From the collimating free end 16, the light travels through the first limb 10 to be reflected through 90 degrees by an internally reflecting surface 18, from where the light travels through the back portion 14 to a further internally reflecting surface 20, reflecting the light through a further 90 degrees to travel through the second limb 12 towards the receiver 4. A free end 22 of the second limb 12 is shaped so as to focus the light as it leaves the light guide 8 on to the receiver 4. Specifically, the free ends 16 and 22 comprise respective convex refractive surfaces. In some embodiments the free end 16 comprises a concave refractive surface and the free end 22 comprises a convex refractive surface.

The first limb 10, adjacent the emitter 2, is longer than the second limb 12, adjacent the receiver. This arrangement enables the free end 16 to be placed in proximity to the emitter 2 while providing a larger gap between the free end 22 and the receiver 4. It will be appreciated that, in some embodiments, the larger gap can equally be provided between the free end 16 and the emitter 2 by changing the relative length of the limbs 10 and 12.

A coding wheel 24 is disposed in the gap between the free end 22 and the receiver 4. The coding wheel 24 comprises an aperture 26. When the aperture 26 is aligned with the optical axis passing through the receiver 4 and free end 22, light is transmitted from the emitter 2 to the receiver 4 to be detected by the receiver 4. When a portion of the remainder of the coding wheel 24 is disposed between the free end 22 and the receiver 4, no light is transmitted. Thus, rotation of the coding wheel 24 results in a series of pulses at the output of the receiver 4, the frequency of which will depend on the speed of the coding wheel 24. In other embodiments, the position of the wheel is detected based on the shape of the aperture or slot in the coding wheel and signals from a plurality of receiver/emitter pairs.

It will be understood that, in some alternative embodiments, the coding wheel 24 comprises a plurality of apertures 26, thus increasing the frequency of the pulses at the output of the receiver 4 for a given rate of rotation of the coding wheel 24. Equally, the coding wheel may be provided as a translucent or transparent coding wheel with opaque regions in place of the aperture 26 to result in a drop in a signal at the output of the receiver 4 as the opaque region or regions passes between the free end 20 to enter receiver 4. The coding wheel may also have semi-reflecting, polarising and generally filtering regions. The described detector is suitable for use within any coding wheel having regions that differentially affect light transmission between the emitter 2 and the receiver 4.

Figure 2:
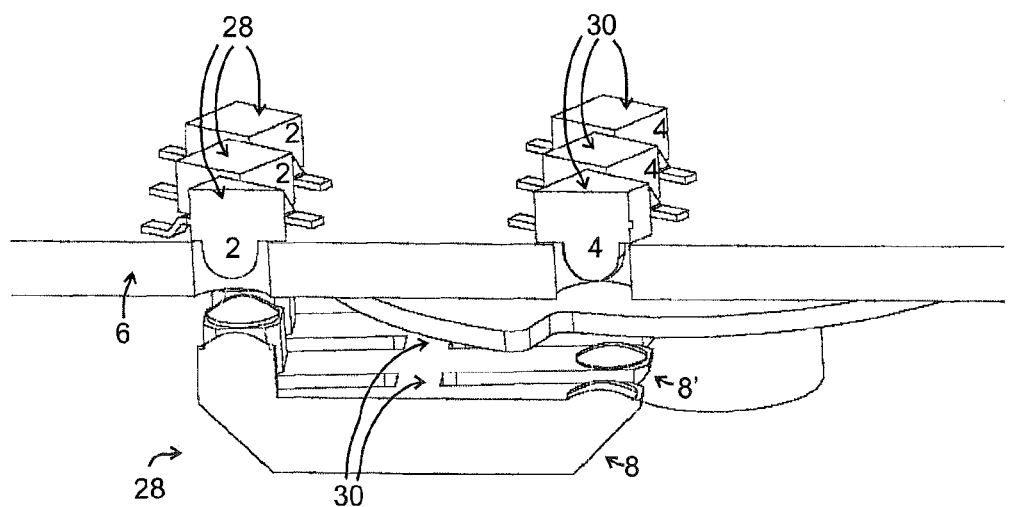
FIG. 2 shows a perspective view of a specific embodiment having a dual light path.

With reference to FIG. 2, a specific arrangement with three light paths is illustrated in a perspective, partially cut away view. The emitter 2 and receiver 4 are mounted on the PCB 6 with their respective housings 28 and 30 extending from one side of the PCB and lenses for transmitting light to and from the LED and photodiode extending through respective through holes on the PCB 6. Respective sets of emitters 2 and receivers 4 are provided, extending through corresponding through holes in the PCB 6. A light guide 28 is provided with corresponding first (8) and second and third (8') portions each corresponding to the light guide described with reference to FIG. 1 above. Some embodiments have only one or two or more than three light paths and corresponding sets of receivers and emitters. Each portion defines a respective optical path between corresponding emitters 2 and receivers 4. The portions 8 and 8' of the light guide 28 are spaced from each other by a connecting portion 30, thereby sparing material of the light guide where it is not needed to implement the optical paths. In other embodiments, the portions 8 and 8' may be joined together, for example having common reflective surfaces 18 and 20, resulting in a simpler structure, for example enabling the use of a simple mould.

The light guide in the embodiments described above may be manufactured using a variety of techniques well known to the person skilled in the art, for example by injection moulding, machining or a combination thereof. The light guide is located within a plastic enclosure with the other components and is secured in place by over moulding or press fitting, in some embodiments. In some embodiments, the PCB 6 is held in place by retainers to maintain correct distance to the light guide.

Some embodiments include applications in which the coding wheel is coupled to a corresponding sensor or transducer. For example, in a utility meter, the transducer will translate consumption of a utility to mechanical movement of the coding wheel. For example, in a gas meter, flow of gas will cause rotation of the coding wheel 24, while in a heat or water meter, flow of water results in rotation of the coding wheel 24. In an electricity meter, flow of current will cause rotation of the coding wheel 24. However, the above embodiments are not limited to any particular application but provide a general purpose opto-electric transducer to transduce movement of a movable part relative to a stationary part carrying the opto electric transducer.

For the avoidance of doubt, the terms collimating and focusing are used herein to indicate that light rays are refracted to move, respectively, towards a parallel configuration or a focused configuration at a given focal point. This does not necessarily imply or is not limited to perfect collimation or focusing.

It will be understood that the above description has been made by way of example to illustrate the benefits, advantages and principles of operation of the present disclosure and not for the purpose of the limitation of the invention set out in the accompanying claims.

The invention claimed is:

1. A light guide comprising:
    an entry surface shaped to collimate light entering the light guide in an entry direction along an optical axis; and
    a plurality of planar reflective surfaces arranged to reflect light inside the light guide along the optical axis to exit the light guide at an exit surface in an exit direction, the exit direction having a direction component opposite the entry direction, wherein the light guide comprises two limbs extending from either end of a back portion, free ends of the limbs being respectively shaped to provide the entry and exit surfaces, wherein the ends of the back portion are shaped to each provide a reflective portion, and wherein one of the limbs is shorter than another one of the limbs, thereby providing a space for accepting a movable part including at least one of polarizing portion or a filtering portion, the moveable part capable of intersecting the optical axis.

2. A light guide as claimed in claim 1, wherein the optical axis at the exit surface is parallel to the optical axis at the entry surface.

3. A light guide as claimed in claim 1, wherein the optical axis at the exit surface is parallel to the optical axis at the entry surface, and the plurality of reflective surfaces are two reflective surfaces.

4. A light guide as claimed in claim 1, wherein the exit surface is shaped to focus light exiting the light guide along the optical axis.

5. A light guide as claimed in claim 1, wherein the light guide is one or more of moulded and machined as one piece.

6. A light guide as claimed in claim 1, further comprising one or more further entry surfaces to define one or more further optical axes, wherein the one or more further optical axes are parallel to the optical axis between the entry surface and the exit surface.

7. A detector for detecting interruption of a light path, the detector comprising:
    a light emitter;
    a light receiver; and
    a light guide according to claim 1, wherein the light guide is disposed opposite the light emitter and the light receiver to define the space between the light guide and at least one of the light emitter and the light receiver, wherein a light path between the light emitter and the light receiver is interruptable by the moveable part in the space.

8. A detector as claimed in claim 7, wherein the light guide comprises a concentrator arranged to focus light from the light guide towards the light receiver.

9. A detector as claimed in claim 7, wherein the light guide comprises a first reflective surface arranged to reflect light received from the entry surface to a second reflective surface arranged to direct the received light towards the light receiver.

10. A detector as claimed in claim 9, wherein the first and second reflective surfaces are perpendicular to each other.

11. A detector as claimed in claim 7, further comprising one or more further light emitters, one or more further light receivers, and one or more further guiding arrangements arranged to enable detecting an interruption of one or more further light paths by the moveable part.

12. A utility meter comprising a detector of claim 7, wherein the moveable part is coupled to a consumption sensor such that movement of the moveable part is indicative of a quantity sensed by the consumption sensor.

13. A light guide as claimed in claim 1, wherein the light guide is to be statically mounted within a utility meter.

14. An apparatus, comprising:
    a utility meter;
    a coding wheel rotatably coupled within the utility meter, wherein the coding wheel includes at least one of a polarizing portion or a filtering portion; and
    a light guide to guide light along an optical path between an emitter and a receiver, the light guide, including:
        a first portion including an entrance, the first portion to collimate light entering the light guide;
        a second portion including an exit; and
        a third portion disposed between the first portion and the second portion, the first portion extending from a first end of the third portion, the second portion extending from a second end of the third portion, the first portion being shorter than the second portion to provide a space to enable the coding wheel to intersect the optical path at the exit.

15. An apparatus, comprising:
    a printed circuit board defining a first portion and a second portion;
    an emitter to be disposed adjacent the first portion;
    a receiver to be disposed adjacent the second portion;
    a light guide coupled between the first portion and the second portion, the light guide to guide light from the emitter along an optical path between the emitter and the receiver, a first end of the light guide to be coupled to the first portion; and
    a space being defined between a second end of the light guide and the second portion to enable a coding wheel to be received within the space to intersect the optical path, wherein the first portion includes a first aperture and the second portion includes a second aperture, the emitter to emit the light through the first aperture, the receiver to receive the light through the second aperture.

16. The apparatus of claim 15, wherein a first axis of the first aperture is substantially parallel to a second axis of the second aperture.

* * * * *